J. G. KENNEDY.
NUT BLANCHING MACHINE.
APPLICATION FILED MAY 21, 1920.
1,367,664.
Patented Feb. 8, 1921.
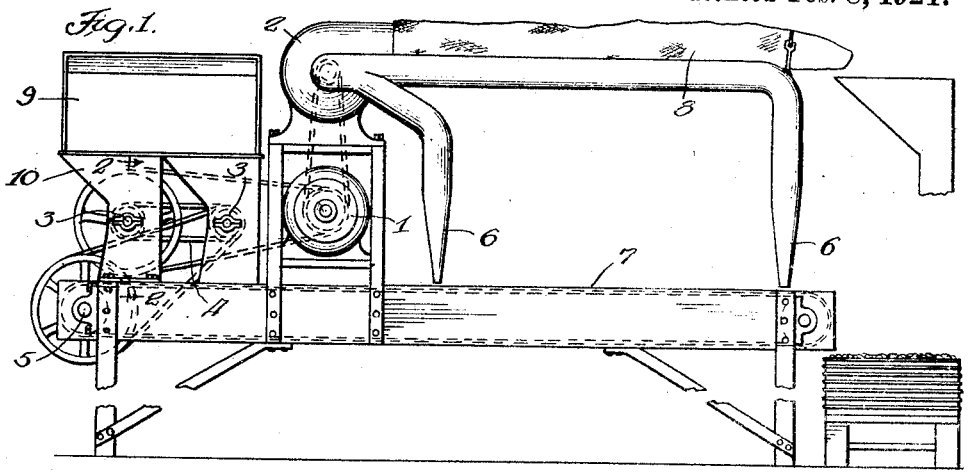
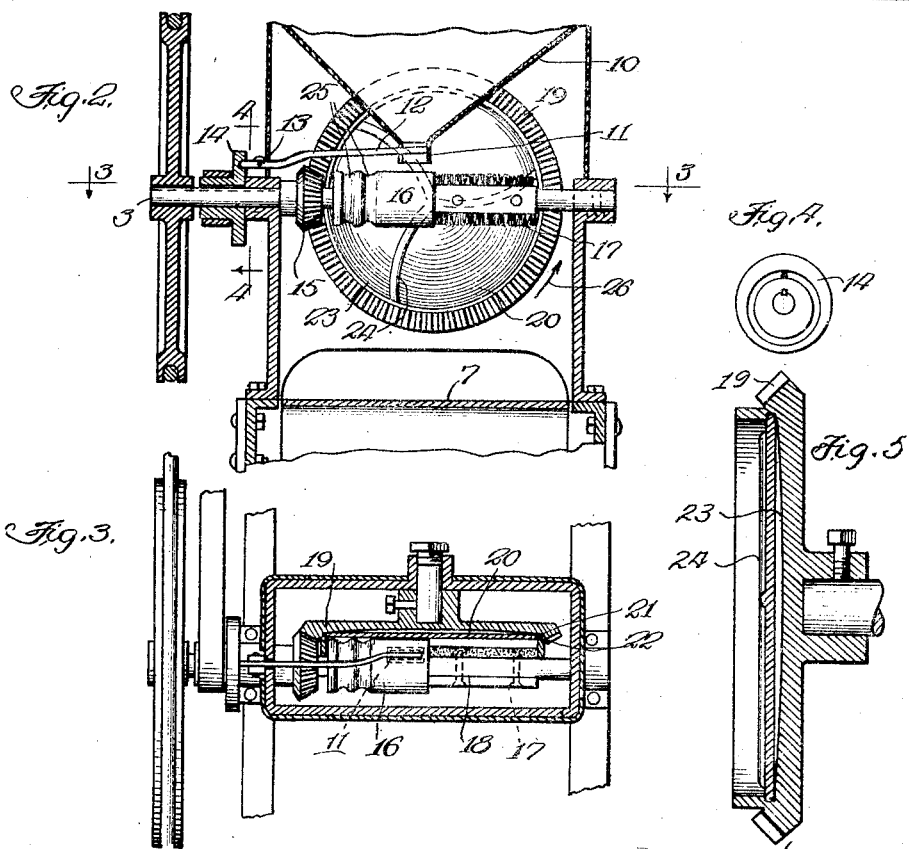

UNITED STATES PATENT OFFICE.

JAMES G. KENNEDY, OF CHICAGO, ILLINOIS, ASSIGNOR OF ONE-HALF TO WILLIAM H. BROWN, OF CHICAGO, ILLINOIS.

NUT-BLANCHING MACHINE.

1,367,664.  Specification of Letters Patent.  Patented Feb. 8, 1921.

Application filed May 21, 1920. Serial No. 383,070.

*To all whom it may concern:*

Be it known that I, JAMES G. KENNEDY, a citizen of the United States of America, and a resident of Chicago, county of Cook, and State of Illinois, have invented certain new and useful Improvements in Nut-Blanching Machines, of which the following is a specification.

This invention relates to machines for removing the inner envelops, skins, chaff, or husks of nuts and grains. In the embodiment of the invention shown in the drawings it is designed particularly for removing the inner envelops or skins of almonds.

The design shown in principle imitates the natural action when the skins of almonds are removed by hand after the almonds have been steamed or dipped in hot water.

The objects of the invention are accomplished by the device shown in the accompanying drawings, in which—

Figure 1 is a front elevation of a machine constructed according to this invention.

Fig. 2 is a sectional detail taken on the line 2—2 of Fig. 1.

Fig. 3 is a sectional detail taken on the line 3—3 of Fig. 2.

Fig. 4 is a face view of a box cam for operating a feed regulating and agitating arm extending into one of the supply hoppers of the device.

Fig. 5 is an enlarged sectional detail of one of the skin-removing elements and its supporting gear.

The principal structural features of this machine are a pair of coacting rotary rubber surfaced members between which the almonds are rubbed for the purpose of removing the skins. These coacting members have a relative motion both in direction and surface speeds to produce the desired rubbing action on the almonds and are also ridged and grooved in a novel manner to cause the almonds to travel downwardly between or along the surfaces of said coacting members and then downwardly between the same to a receiving conveyer. The conveyer carries the almonds beneath a plurality of suction nozzles which remove the loosened almond skins from the conveyer.

Referring to the drawings, power is supplied to the device preferably by a single unit, such as an electric motor 1, which is belted to drive a blower 2 and one of a plurality of driving shafts 3 for the almond skin removing devices. The driving shafts 3 are belted together by a chain 4 and one of these shafts is also belted to a conveyer driving shaft 5.

The blower 2 is arranged to create an upward flow of air through the nozzles 6 adjacent the upper surface of the conveyer belt 7. The chaff, etc., which is on the conveyer is by this means removed and delivered to a receiving bag 8.

The almonds or other seeds to be treated by the apparatus are delivered to the same in the receiver 9 and if the articles treated are almonds these are preferably soaked in hot water before being placed on the receiver. Scalding the almonds serves to soften them sufficiently to permit passage through the machine without being broken or split and also loosens the skins. The receiver 9 communicates with the skin removing devices driven by shafts 3, by the hoppers 10. The outlet 11 of each hopper is controlled by an oscillating arm 12 which regulates the rate of feed of the almonds and serves to agitate the same sufficiently to prevent clogging at the outlet of the hopper. The arm 12 is oscillated around its bearing 13 by the box cam 14 fastened to shaft 3. The shaft 3 also carries fast a pinion 15, a cylindrical rubber 16 and a pair of brushes 17, which are clamped to a square portion 18 of the shaft. The pinion 15 is beveled and meshes with a bevel gear 19 so that the latter may drive a rubber disk 20 having an axis at right angles to the axis of the roller 16 and for coöperating therewith. The rubber disk 20 is supported in an annular recess 21 formed in an annular flange 22 on the face of gear 19.

The face of gear 19 is concave, as indicated in Fig. 5 by the numeral 23, to permit the disk to recede from roller 16 when forced by the passage of almonds.

The disk 20 is provided with a plurality of spiral ridges 24 radiating from the center of the disk. The function of these ridges is to carry downwardly almonds which fail to immediately pass between the roller and the disk. The centrifugal action of the disk on almonds in the trough, formed by the disk and roller, causes any remaining almonds to travel to the left of the roller and then downwardly at the grooves 25. The gear 19 and disk 20 rotate in the direction indicated by the arrow 26, which is necessary to cause the almonds to work between the disk and roller, or toward the left of the roller.

The treated almonds from which the skins have been removed drop onto the conveyer 7. The almond skins which adhere to the corrugated disk 20 are removed therefrom and permitted to fall on the conveyer by means of the rotary brushes 17.

In the operation of the device the almonds from the hoppers 10 are fed to the troughs formed between rollers 16 and disk 20 in the separate skin removing devices. The flow of almonds to each device is controlled by one of the oscillating agitating arms 12. The roller 16 and disk 20 have nearly the same peripheral speeds at the left end of roller 16, being geared together just outside of this point. From this point toward the center of disk 20 the relative peripheral speeds change uniformly, as the central part of disk 20 moves much more slowly. By this means the rubbing action of the two coacting rubber surfaced members on the nuts being treated is different in speed and direction.

Both the removed skins and blanched almonds finally pass downwardly to the conveyer. The rotary brushes 17 keep the surface of disk 20 clear of almond skins. The removed skins are lifted from the conveyer by the action of a suction device through the nozzles 6, the almonds being delivered to a stack of trays at the right of the machine.

Although but one specific embodiment of this invention has been herein shown and described, it will be understood that numerous details of the construction shown may be altered or omitted without departing from the spirit of this invention as defined by the following claims.

I claim:

1. A machine of the class described, comprising a pair of resiliently surfaced coacting members, means for rotating said members, one of said members being in the form of a disk and the other member being cylindrical in form, and a ridge on the surface of one of said members for causing seeds to pass between said members.

2. A machine of the class described, comprising a disk and a cylinder having axes at right angles for the purpose of coacting by a rubbing action on seeds delivered between said members, the disk-shaped member having a ridge radiating from its center for the purpose of causing seeds to pass between said members.

3. A machine of the class described, comprising a disk and a cylinder having axes at right angles for the purpose of coacting by a rubbing action on seeds delivered between said members, the disk-shaped member having a ridge radiating from its center and the cylindrical member having an annular groove at one end.

4. A machine of the class described, comprising coacting rotary disk and cylinder, the surfaces of said disk being ridged radially and means for rotating said disk and cylinder.

5. A machine of the class described, comprising a coacting resilient disk and a cylinder, means for rotating said disk and cylinder, and a support for said disk having a concave surface opposed to the disk.

6. A machine of the class described, comprising a coacting resilient disk and cylinder, means for rotating said disk and cylinder, the disk having a ridge radiating from its center, and a support for the disk having a concave surface opposed to the disk.

7. A machine of the class described, comprising a coacting resilient disk and cylinder, means for rotating said disk and cylinder, the coacting surface of the disk having a plurality of spiral grooves radiating from its center.

8. A machine of the class described, comprising a pair of coacting driven members, one of said members having a resilient surface, one of said members being in the form of a disk, and the remaining member being in the form of a cylinder said cylinder having an annular groove at one end and said disk having a ridge radiating from its center.

9. A machine of the class described, comprising a pair of coacting driven members, one of said members having a resilient surface, one of said members being in the form of a disk, and the remaining member being in the form of a cylinder, said cylinder having an annular groove at one end and said disk having a ridge radiating from its center, and a rotary brush coaxial with said cylinder and arranged to clean the surface of said disk.

10. A nut blanching machine comprising a disk and cylinder having axes at right angles and arranged to yieldably coact by a rubbing action on nuts delivered between said disk and cylinder, and means for rotating the disk and cylinder.

11. A nut blanching machine comprising a disk and cylinder having axes at right angles and arranged to coact by a rubbing action on nuts delivered between said disk and cylinder, and means for rotating the disk and cylinder.

12. A nut blanching machine comprising a pair of driven coacting resilient members, said members being arranged to have relative graduated surface speeds and means for delivering nuts to between said members.

Signed at Chicago this 17 day of May, 1920.

JAMES G. KENNEDY.